March 3, 1936.                E. ZAHNER                    2,032,899
                          MECHANICAL BLASTER
                        Filed Aug. 30, 1934
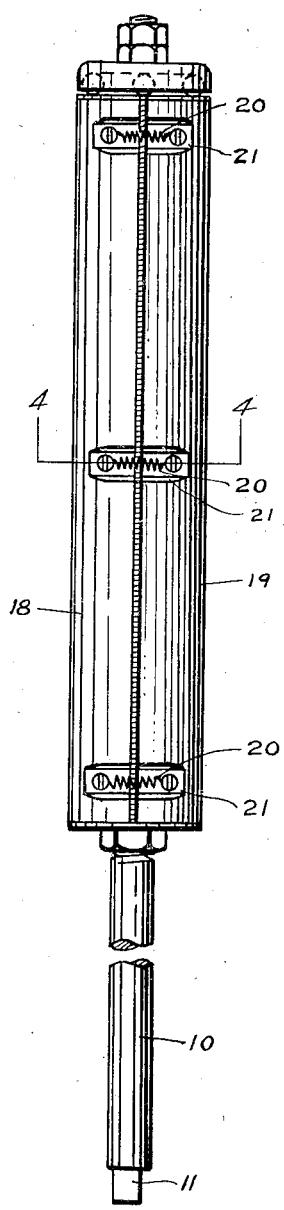
Fig. 1
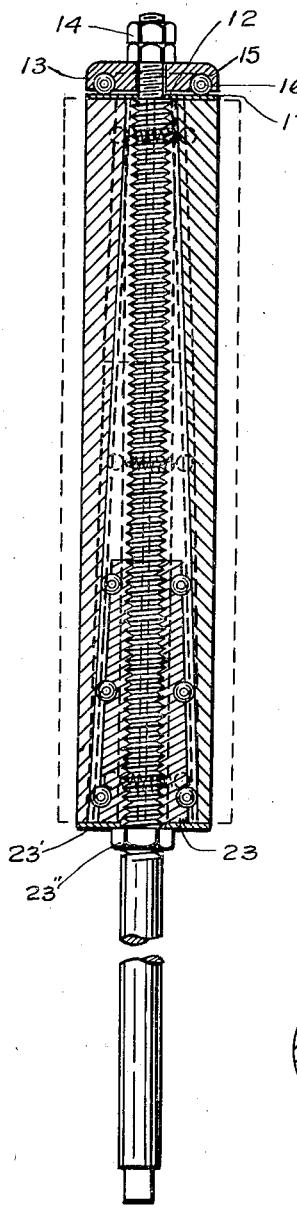
Fig. 2
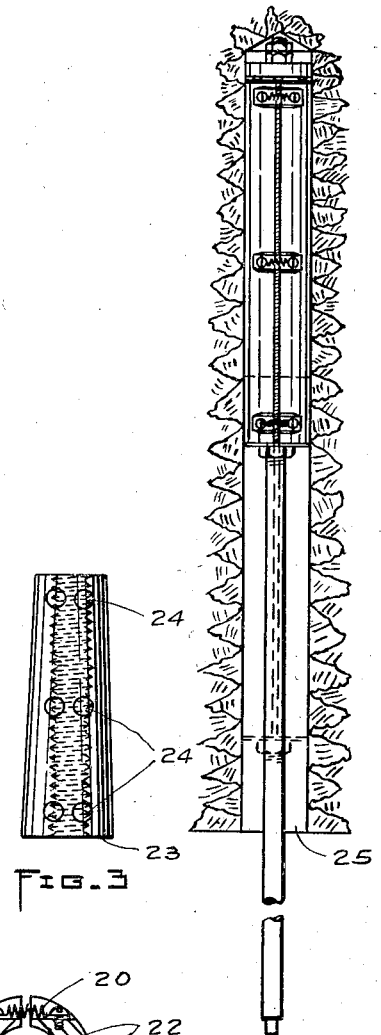
Fig. 3
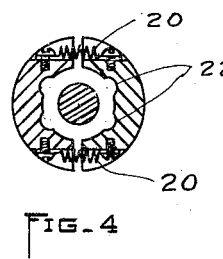
Fig. 4
Fig. 5
INVENTOR
Ernest Zahner
BY
Jefft & Jefft
ATTORNEYS Patented Mar. 3, 1936

2,032,899

UNITED STATES PATENT OFFICE 2,032,899

MECHANICAL BLASTER

Ernest Zahner, East Peoria, Ill.

Application August 30, 1934, Serial No. 742,197

1 Claim. (Cl. 262—12)

This invention has reference to improvements in devices for breaking and splitting coal and particularly to that class of devices adapted to be inserted in a hole first bored in the coal and expanded by means of power applied to an element of the device.

The principal object of the invention is to provide a split tubular mechanism having separable parts and means for forcing separation thereof consisting of a member movable with respect to said parts wherein said parts act as abutment means for the mechanism moving the member.

Another object is to provide a mechanism as noted wherein the motive power driving the moving part is applied in a rotative manner and the expanding pressure is abutted within the device whereby the device may be used in practice without anchorage to other portions of the material being mined.

A further object is to provide a device of the class described which is simple, rugged easily placed in position and easily operated to accomplish its purpose.

Another object lies in the provision of a mechanical blaster which is capable of producing the result desired in a quick, efficient manner with a minimum of effort on the part of an operator and low consumption of power.

Other objects will appear in the following description and accompanying drawing in which:

Fig. 1 is an elevational view of my device showing features to be described;

Fig. 2 is a sectional view of the same showing details of underlying parts;

Fig. 3 is an elevational view of an expanding member to be described;

Fig. 4 is a sectional view taken on line 4—4 in Fig. 1 and

Fig. 5 is a view showing application of the device as used in practice, which view will be referred to in the description.

The drawing discloses my invention as comprising an assembly including a threaded shaft 10 having a lower squared end portion 11 and an upper shouldered portion 12.

The shouldered portion 12 is fashioned to receive a head or abutment member 13 and is threaded down upon the abutment member to hold the same firmly attached to shaft 10.

The abutment head is provided with an annular groove 15 in which are disposed a plurality of balls 16 which rest upon a washer 17 which is provided with an opening of suitable size to permit free rotation of shaft 10 therein.

Disposed upon either side of shaft 10 are semi-circular shell members 18 and 19 which are held in clasp relation to shaft 10 by springs 20, the latter being disposed in recesses 21 formed in opposite sides of the members 18 and 19.

A washer 23', backed by a nut 23'', confines the shell assembly on shaft 10 in the relation shown.

Fig. 4 illustrates that the exterior conformity of shell members 18 and 19 is substantially circular when the members are in normal closed position.

As shown in Fig. 2, the interior surface of the shell members is so fashioned as to provide a longitudinally tapered opening therebetween, the opening being relatively large at the bottom and decreasing toward the top.

Longitudinally disposed in the interior surfaces are grooves 22, best shown in Fig. 4.

Figs. 2 and 3 illustrate an expanding member 23 having tapered sides, a threaded central opening adapted to receive the shaft 10 in screwed relation and a plurality of balls 24 arranged in rows on opposite sides in position to be received in the grooves 22 of shell members 18 and 19. The balls are preferably rotatably retained in pockets formed in the body of the member.

In Fig. 2 it is shown that expanding member 23 is adapted to be screwed upon shaft 10 with balls 24 disposed in grooves 22 of shells 18 and 19 and with springs 20 urging the shells toward the expanding member. The body of the expanding member is preferably made in such proportion that the expanding member is longitudinally movable between the shells without contact between the surfaces thereof. The balls 24 and grooves 22 are so proportioned that the full bearing pressure between the expanding member and shells is supported by the balls resting in grooves 22. Thus the expanding member may be moved longitudinally between the shells with a minimum of friction. The balls, moving in the grooves also act as a key means whereby rotation of the expanding member within the shells is prevented.

Operation of the device is as follows:

Assuming the parts described to be in relative position indicated in Figs. 1 and 2, it will be apparent that if shaft 10 is rotated in proper direction the member 23 will be forcibly moved upwardly toward the head 13.

Due to the described tapered fashioning of the shells 18 and 19 the expanding member, as it travels toward the head, is effective to spread the shells apart, which movement is permitted by springs 20, toward the position shown in dotted outline in Fig. 2.

It is to be noted that during the described expanding movement the force required to expand the shells is transmitted through the screw threads of shaft 10 and that the shaft is abutted against longitudinal movement by the head 13 bearing upon the ends of the shells.

Shaft 10 may be rotated manually or by power, the squared end 11 providing means for connection with any source of power. Rotation of the shaft brings about longitudinal movement of expanding member 23 as described and the force acting in longitudinal direction is applied between the expanding member moving longitudinally of the shells and the head 13 resting upon the ends thereof.

Thus all of the forces, except those applied in rotative direction are absorbed within the device, making it a self contained expanding unit.

The utility of the above noted feature will be apparent when the view shown in Fig. 5 is considered.

In a hole designated 25, drilled to the desired depth in coal or the like, the device, in contracted adjustment is inserted.

The device is placed as shown in solid lines, the shaft rotated, and the device expanded to exert a separating force of sufficient magnitude to split the coal. During the above operation there has been no force applied tending to move the device longitudinally of the hole. Rotational movement is prevented by frictional contact with the wall of the hole.

In view of this it will be apparent that the device may be placed and operated at any position in the hole without external abutment means. For example, when it is desired to first rupture the material near the mouth of the hole, my blaster may be placed in position shown in dotted lines and operated as described to first rupture the forward part. It may then be moved back toward the base of the hole and operated to complete the rupture along the entire length of the hole.

It is to be noted that the ball thrust bearing described in connection with head 13 may be replaced by any other form of bearing, and that the balls 24 may be replaced with any other means for preventing rotation of expanding member 23 in the shells 18 and 19.

Obviously, numerous modifications may be made in the structure of my device without alteration of principle involved. I do not wish to be limited except within the scope of the appended claim.

What I claim is:

An expanding mechanism comprising dual elongated members having a semi-circular section, the exterior surfaces thereof having a substantially uniform radius throughout their length, the interior surfaces thereof each having a longitudinal groove formed upon a relatively large radius at one end and a decreasing radius toward the opposite end, said members adapted to be placed together to form a split tube having a substantially uniform exterior diameter and a tapered interior diameter, resilient means for holding the members together as aforesaid, a threaded shaft disposed within the tube having a thrust bearing resting upon the small diameter end thereof, and means for driving connection at its opposite end, an expanding member screwed upon the shaft normally disposed in the large diameter end of the tube in such a manner that rotation of the shaft brings about movement of the expanding member toward the small diameter end to separate the tube members, and means for preventing rotation of the expanding member within the tube.

ERNEST ZAHNER.